May 2, 1950 H. M. SCARFF 2,506,177
RING CLOSING FIXTURE
Filed July 29, 1946 2 Sheets-Sheet 1
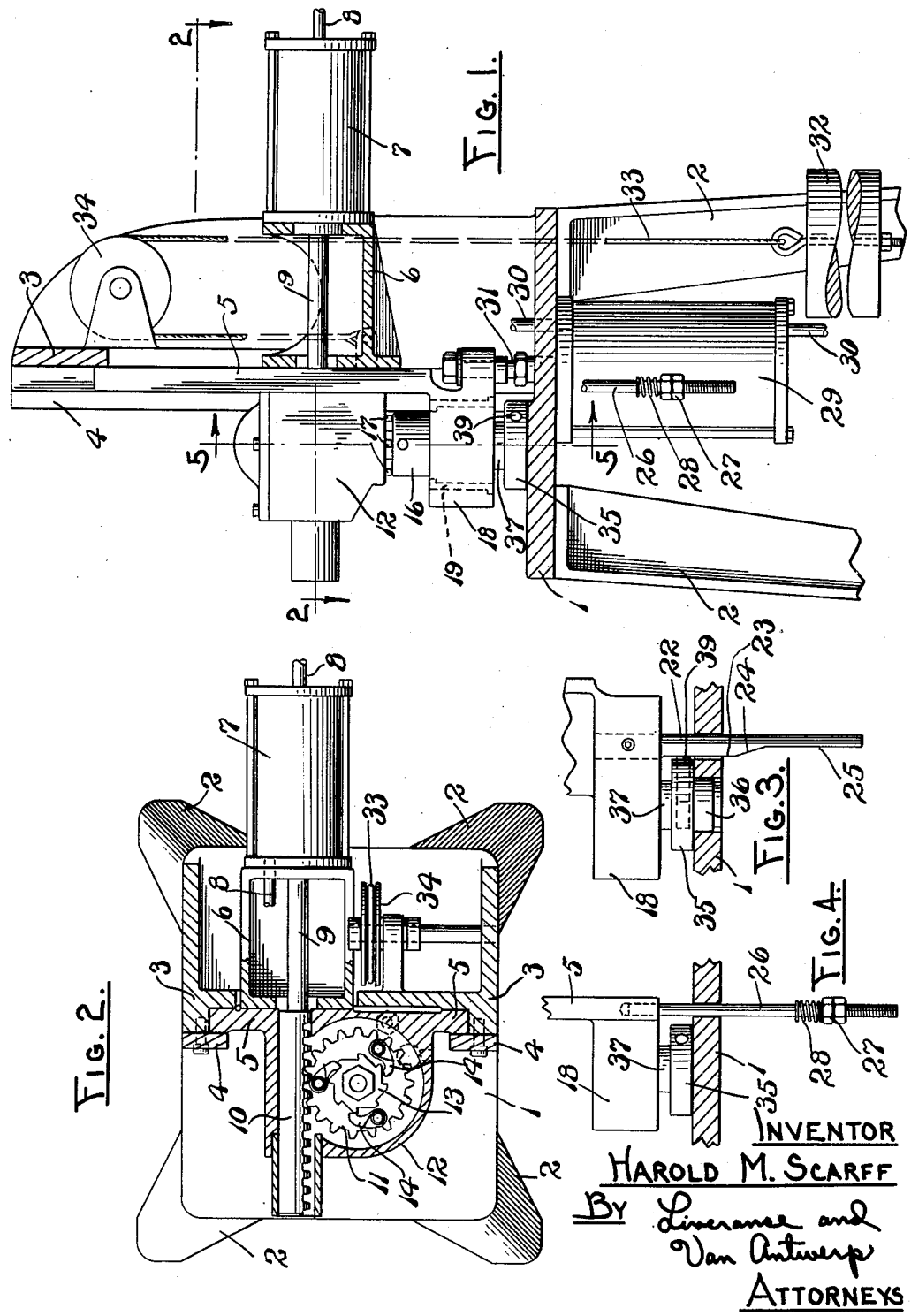
INVENTOR
HAROLD M. SCARFF
BY Liverance and
Van Antwerp
ATTORNEYS May 2, 1950          H. M. SCARFF          2,506,177
RING CLOSING FIXTURE
Filed July 29, 1946          2 Sheets-Sheet 2
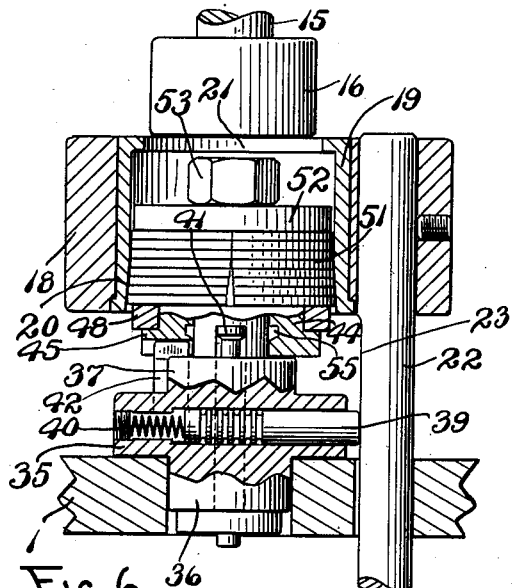
FIG. 6.
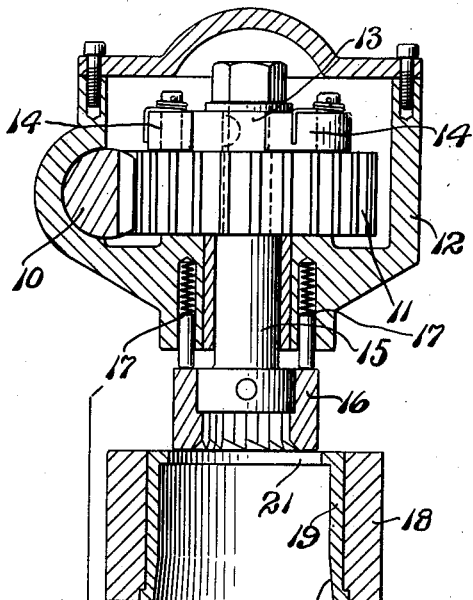
FIG. 5.
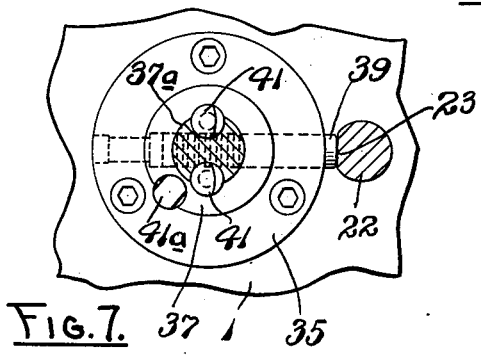
FIG. 7.
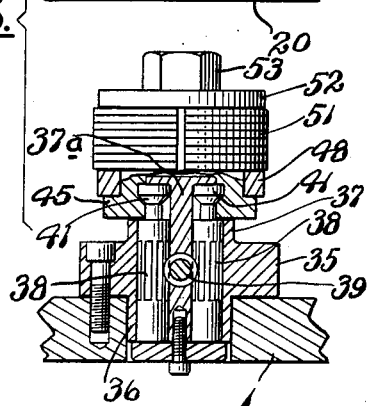
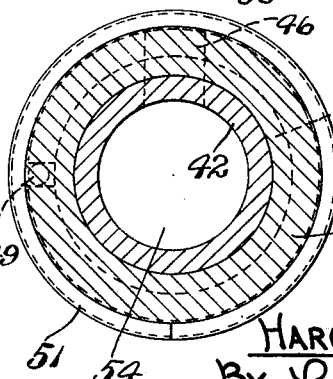
FIG. 9.
FIG. 8.
INVENTOR
HAROLD M. SCARFF
BY Liverance and
Van Antwerp
ATTORNEYS Patented May 2, 1950

2,506,177

UNITED STATES PATENT OFFICE 2,506,177

RING CLOSING FIXTURE

Harold M. Scarff, Muskegon, Mich., assignor to Muskegon Piston Ring Company, Muskegon, Mich., a corporation of Michigan Application July 29, 1946, Serial No. 686,965

9 Claims. (Cl. 29—269)

This invention relates to a piston ring closing fixture.

Piston rings usually made from individual castings, or from double width or twin castings which have been divided between opposite sides to provide individual castings, require in the finishing operations the removal of a segment at one side of the ring casting to make a gap or parting, the casting being of a shape that when the parting is closed, after the removal of a segment, the ring takes a substantially perfectly circular form. Many operations may be performed upon the ring castings after such segment removal has been made, requiring that the castings be closed at their partings and held against their normal tendency to spring outward. When thus held, finishing operations at the outer curved surface, such as finishing cuts in the lathe and, in particular, the sawing through the rings of spaced apart oil vent slots are performed.

The present invention is concerned with a machine by means of which a number or plurality of the ring castings, from which the parting segments have been cut, may be placed on an arbor with the partings open, and the arbor placed in the machine and by mechanism provided the arbor locked in place, the rings all closed at their partings to the desired amount, and the plurality of rings lying side by side clamped together and held against opening at such partings, so that the arbor with the clamp closed rings may be removed from the machine and subsequently the rings machined as may be required, one example of which is the sawing of oil vents or slots from the outer curved to the inner curved sides of the rings.

It is a principal object and purpose of this invention to provide a very practical and serviceable, novel machine by means of which the ring castings may be closed at their partings, and the rings held closed together in proper position for the ring oil vent slotting to be performed, and to provide such machine by means of which a very large quantity handling of the ring castings and their closing and clamping may be performed with maximum speed.

An understanding of the invention may be had from the following description taken in connection with the accompanying drawings, in which, Fig. 1 is a side elevation and partial vertical section of a machine built in accordance with my invention.

Fig. 2 is a horizontal section, substantially on the plane of line 2—2, looking in a downward direction.

Figs. 3 and 4 are fragmentary vertical sections through the table of the machine and showing, in Fig. 3, the detail of the mechanism for automatically releasably locking a ring carrying arbor in place, and in Fig. 4 a shock absorbing limit stop for certain moving parts of the machine.

Fig. 5 is an enlarged vertical section through the ring holding arbor and the fixture upon which it is detachably held, and above it the mechanism for closing the rings at their partings and for tightening the clamping nut for holding them against separation.

Fig. 6 is a fragmentary enlarged vertical section showing the separated parts in Fig. 5 together during the clamping closing of the rings, the section in Fig. 6 being in right angles to that in Fig. 5.

Fig. 7 is a fragmentary plan view of the arbor carrying fixture of the machine.

Fig. 8 is an enlarged central vertical section through the ring carrying arbor, and Fig. 9 is a horizontal section therethrough.

Like reference characters refer to like parts in the different figures of the drawings.

In the construction of the machine illustrated, a horizontal table or bed 1 is supported at the required height by corner legs 2. Across the bed 1 a vertical support 3 (Fig. 2) is either integrally cast or permanently secured, which, at its front side carries spaced vertical retaining guide bars 4 between the inner edge portions of which and the support 3, vertical guideways are made for the slidable connection of a vertically movable carriage 5 which, in the operation of the machine, is raised and lowered as hereinafter described. The support 3 has an opening through it and a fixture 6 extends at its forward portion through said opening and is permanently connected to the rear side of the carriage 5. At the rear end of the part 6, a horizontal cylinder 7 is secured adapted to receive compressed air selectively at either end through the pipes 8.

A piston rod 9 extends outwardly from the forward end of the cylinder 7 and at its front portion is equipped with a rack 10, the teeth of which mesh with a gear 11, said rack 10 and gear 11 being suitably mounted within an enclosing housing 12 integral with the carriage 5. The gear 11 is moved with the reciprocating movements of the rack 10 rotating in one direction and the back in the opposite direction. A ratchet wheel 13 has the teeth thereof engaged by spring actuated pawls 14 pivotally mounted on gear 11 around the ratchet wheel. Said ratchet wheel is secured at the upper end of a vertical shaft 15 which extends downwardly through the housing 12 (Fig. 5), and at its lower end has a nut engaging socket 16 permanently secured. By means of the spring and pin construction, shown at 17 (Fig. 5) a limited vertical movement of the shaft 15 and the socket 16 is permitted, the springs normally holding the parts in their lower position but yielding so that the socket member 16 has a possibility of vertical movement until it comes against the under side of the housing 12.

Near the lower end of the carriage 5, a relatively heavy bracket 18 extends in a forward direction. It has a vertical cylindrical opening through it in which a sleeve 19 is secured by press fit or other suitable connection. The upper interior surface of the sleeve 19 is of a vertical cylindrical form and the lower portion is of conical form as shown at 20 extending downwardly and slightly outward at an acute angle to the vertical (Fig. 5). The upper end of the sleeve has a central opening 21. The vertical axes of the shaft 15 and of the sleeve 19 are coincident.

From the bracket 18 a rod 22 (Fig. 3) extends downwardly through the table 1. At its upper portion at the side toward the sleeve 19, it is flattened for a part of its length at 23. The lower intermediate portion of the rod is cut away at the same side making an inclined surface 24, reaching substantially to the center of the rod with a vertical flat surface 25 below the inclined surface at 24. The inclined surface at 24 acts as a cam at one position of the rod in the vertical movements of the carriage 5 for locking or releasing the ring carrying arbor as hereinafter described. Also extending downwardly from the carriage 5 is a rod 26 (Fig. 4). It passes through the table 1 and is threaded at its lower end portion receiving nuts 27 thereon above which around the rod is a coiled cushioning bumper spring 28. Such structure limits the carriage in upward movement.

At the under side of the table 1, a vertical cylinder 29 is secured adapted to receive compressed air alternately at opposite ends through the pipes 30. The piston rod 31 extending upwardly therefrom is connected with the carriage 5 for moving it in the guideways provided by the support 3 and the bars 4. The weight of carriage 5 and the parts connected therewith is counter-balanced by a weight 32 with which one end of a cable 33 is connected. The cable leads upwardly over a grooved pulley 34 and is secured at its opposite end to the member 6, (Fig. 1).

Below and in axial alinement with the sleeve 19 an arbor carrying fixture is mounted on the table. It includes a body 35 bolted to the table (Fig. 7) from the lower side of which a cylindrical projection 36 extends into an opening in the table. From the upper side of a second cylindrical projection 37 extends, the upper portion of which is reduced in diameter as shown at 37a in Fig. 5.

Two rods 38 are mounted vertically extending through said body and lower projection 36 and are provided with pinion teeth lengthwise thereof between their ends, which are in engagement with the inner end portion of a rod 39, the portion of which is formed with consecutive annular grooves and ribs (Fig. 6). The outer end of the rod 39 bears against the flattened side 23 of the rod 22 when the member 5 is in its lower position. Said rod is forced outwardly by a spring 40 to follow the inclined section 24 upon elevation of the rod 22 thereby turning the rods 38 about their vertical axes.

Each of the rods 38 at its upper end portion is reduced in diameter to leave at the upper ends thereof, heads 41 each of which at a side thereof, as shown in Fig. 7, is cut away the purpose of which will hereafter be described. Said heads 41, at their upper ends reach to a short distance below the extension 37a of the part 37 (Fig. 5). A locating pin 41a is secured at one side of part 37 extending a short distance above its upper end.

On the fixture thus described the ring carrying arbor is to be detachably mounted and secured. The arbor body 42 at its upper portion has a threaded stem 43 extending vertically therefrom. The body 42 is increased in diameter at its lower portion, as at 44 and at its lower end has an enlarged annular flange 45. The flange has an upwardly extending recess 46 at one place in its length to receive pin 41a, and a vertical slot 47 at one side as shown in Fig. 8. A ring 48 is located around the lower enlarged part 44 of the body of the arbor and rests upon the flange. It carries a pin 49 which enters the slot 47. Above the ring 48 a sleeve 50 of less exterior diameter than the ring 48 is mounted, at its upper end being flush with the upper end of the cylindrical body 42.

On the arbor a number of parted ring castings 51 are placed around the sleeve 50, the lowermost ring casting resting upon the ring 48 below. The uppermost ring extends a short distance above the upper end of the arbor body 42 and a clamping plate 52, having a central opening is located above body 42 sleeve 50 ring castings 51 and a nut 53 is screwed onto the stem 43. By turning the nut 53 in the proper direction the clamping plate 52 may be forced against the uppermost ring 51 and clamp all of the rings together against movement.

The interior of the arbor body is recessed to make a cylindrical recess 54 with an annular groove 55 of enlarged diameter a short distance above the flange 45.

In the operation, a plurality of ring castings 51 are located around the sleeve 50. The clamping plate is placed over them and nut 53 screwed onto the stem 43 but is not screwed down to clamp the ring castings together. The arbor with the rings thereon and with rings open at their partings, as in Fig. 5, is placed over the upper portion 37a of the fixture and rests upon the lower part 37 of the fixture upper extension. When thus put in place, the heads 41 of rods 38 are located with reference to the recess 54 so that their removed portions (Fig. 7) permit entrance, bringing the heads 41 to the groove 55. Such location of the arbor upon the fixture occurs with the carriage 5 and the parts carried in elevated position, and with the end of the rod 39 against the surface 25 of the rod 22.

On entering compressed air or the like into the upper end of the cylinder 29 the carriage 5 is moved downwardly, whereupon the inclined surface 24 on rod 22 moving in a downward direction forces rod 49 inwardly against the spring 40, rotating rods 38 and turning the heads 41 to move their projecting portions in groove 55 and lock the arbor in place. Continued downward movement of the carriage 5 moves the sleeve 19 over the loosely held open ring castings 45 with the result that the conical surface 20 of the sleeve 19 contracts the rings and closes them at their partings. Compressed air is entered into the inner end of the cylinder 7 thereby rotating the gear 11 and the ratchet wheel 13 in a clockwise direction (Fig. 2) so that when the nut 53 reaches the socket member 16, said socket member attached to the shaft 15 being turned in the proper direction it engages the nut and tightens the clamping plate 52 against the stack of ring castings which have all been closed at their partings. The ring castings with all partings closed are clamped in closed position and with all of their curved surfaces forming a cylinder. On reversing the flow of compressed air in the cylinder 29 all of the steps of movement are reversed except the socket member 16 is not reversed in turning movement, this because the pawls 14 are not, when rod 9 and rack 10 are moved in the opposite direction driving the ratchet wheel 13 but pass over the teeth thereof. Accordingly, the nut 53 is not released but the rings remain clamped. But the heads 41 are rotated back to their initial position, in which the ring carrying arbor with the rings clamped thereon, are readily removed after the carriage is moved to its upper position. It is, of course, to be understood with reference to the movement of the carriage, that while compressed air may be introduced into the cylinder 29 at both ends, by making the weight heavy enough it alone may be used to lift the carriage to upper position.

With the structure described arbors may be loaded with rings in loose condition thereon, the arbors in turn located in place by bringing the notch 46 in proper position to receive the upper end of the pin 41a, the compressed air controls operated and the rings closed at their partings and clamped together on the arbor, followed by the vertical lifting of the carriage 5 and the automatic release of the arbor from its table fixture. The control of the compressed air is simple and one long used and need not be entered into in detail of structure.

The invention is defined in the appended claims and is to be considered comprehensive of all forms of structure coming within their scope.

I claim:

1. A ring closing device comprising a table, a carriage mounted on and above the table for vertical reciprocatory movements, a rod carried by said carriage extending through the table, said rod at a side thereof having a downwardly and inwardly inclined surface between two flat vertical surfaces on the rod, an arbor carrying fixture mounted on said table and extending above the same adjacent the rod, vertically positioned locking means rotatably mounted on and carried by said fixture, a spring actuated rod mounted for transverse movement in said fixture, at one end bearing against said first mentioned rod carried by said carriage and following the flat and inclined surfaces thereon upon reciprocation of said carriage, and interengaging means on said spring actuated rod and on said locking means for moving the locking means to operative position on reciprocation of the carriage in one direction and to releasing position on reciprocating movement of the carriage in the opposite direction.

2. A ring closing device comprising a horizontal table, a vertically positioned carriage mounted above the table, means for mounting the carriage for vertical reciprocatory movements, a rod connected with said carriage extending downwardly through the table having a side flattened in different vertical planes at the upper and lower portions of the rod and with an inclined surface connecting said flattened portions, a fixture mounted on said table adjacent said rod, two spaced vertical rods each having consecutive pinion teeth therearound rotatably mounted within said fixture, at their upper ends having heads of generally cylindrical form with a side of each head removed, an additional rod mounted on said fixture in a horizontal position passing between said rotatably mounted rods on the fixture, said additional rod having a plurality of alternate annular ribs and grooves therearound at its inner end portion meshing with said pinion teeth, the outer end of said additional rod bearing against the first mentioned rod carried by the carriage at the flattened and inclined surfaces thereof as the carriage is reciprocated, and spring means carried by said fixture forcing said additional rod against the first mentioned rod.

3. A ring closing device comprising a table, a vertically movable carriage located above the table, means for mounting said carriage for vertical reciprocatory movements toward and away from said table, a fixture mounted on and extending above the upper side of the table, a ring casting carrying arbor adapted to be detachable connected with said fixture, means for connecting said arbor with the fixture upon movement of the carriage vertically in one direction and for disconnecting it therefrom upon movement in the opposite direction, a ring contracting member mounted on said carriage and movable when the carriage is moved in a downward direction to pass over rings carried by said arbor and contract them to close the partings in said ring castings, said arbor having an upwardly extending threaded stem at its upper end, a nut on said stem, a clamping plate under said nut and means for turning said nut to tighten said clamping plate against ring castings carried by the arbor after the castings have been contracted, combined with means for moving said carriage downwardly and thereafter upwardly.

4. A ring closing device comprising a horizontal table, vertical spaced guides connected with and extending above the table, a carriage slidably mounted in said guides for vertical reciprocatory movements, a piston cylinder structure mounted underneath the table including a piston rod connected with said carriage, said piston rod being adapted to be operated to reciprocate said carriage by fluid pressure, a ring casting arbor mounting fixture connected with said table and extending thereabove, a ring casting carrying arbor adapted to be located over the upper portion of said fixture, means carried by said fixture for engagement with said arbor to releasably connect it with the fixture, means operated by movement of the carriage in a downward direction for operating said locking means to connect the arbor with said fixture, said arbor at its upper end having an upwardly extending stem, a nut on said stem, a clamping plate adapted to be located under said nut and over a plurality of ring castings carried by the arbor, a ring casting contracting member adapted to embrace said ring castings and to contract them and substantially close their partings mounted on said carriage and movable downwardly therewith to engage the ring castings at their outer sides and contract them, a rotatable socket member carried by said carriage and movable downwardly and into engagement with said nut on downward movement of the carriage, and means to turn said socket member to tighten the nut after said ring castings have been contracted and thereby clamping them together against opening at their partings, said means securing the ring casting arbor with said fixture being released upon upward vertical movement of the carriage.

5. A ring closing device comprising a horizontal table, means for releasably connecting a ring casting carrying arbor to said table at its upper side, vertically movable means adapted to be moved in a downward direction to embrace piston ring castings carried on said arbor and contract them to close their partings, and a nut turning means on said vertically movable means, combined with means for operating said nut turning means upon said ring casting contracting means reaching substantially its lowermost position of movement.

6. A ring closing device comprising a vertically reciprocable carriage, means for mounting said carriage for vertical movement, means for reciprocating the carriage, a ring casting contracting member mounted on said carriage, a vertical rotatable shaft mounted on said carriage above said contracting member, a socket member connected with said shaft at its lower end adapted to engage and turn a nut, and means for turning the shaft in a predetermined direction to turn said nut.

7. A construction containing the elements defined in claim 6, said means for turning the shaft comprising a piston rod, a piston cylinder apparatus associated therewith for reciprocating the rod, said rod at one end having a longitudinal rack, an idle gear in mesh with said rack, a ratchet wheel connected with said shaft and a pawl mounted on said gear to engage with the ratchet wheel to drive it in one direction of its movement and to pass over the teeth thereof in the opposite direction of said movement.

8. A ring closing device comprising means for releasably holding a ring casting carrying arbor in a predetermined fixed position, said arbor having a plurality of parted ring castings thereon and said arbor having an upwardly threaded stem at its upper end, a nut on said stem, a clamping plate through which the stem passes located below the nut and resting upon the uppermost of said ring castings, a vertically reciprocable carriage mounted adjacent said arbor, a ring casting contracting member carried by the carriage for contracting said rings upon downward movement thereover, a vertical rotatable shaft, a nut carrying socket at the lower end of said shaft to engage said nut on downward movement of said carriage to a predetermined position, and means for rotating said shaft in one direction to tighten said nut against said clamping plate.

9. A construction as defined in claim 8, said means for turning said shaft to tighten the nut comprising a ratchet wheel to turn it in one direction and to not turn it in the other direction of the movement of the rack, and means for reciprocating the rack.

HAROLD M. SCARFF.

REFERENCES CITED

The following references are of record in the file of this patent:

UNITED STATES PATENTS

| Number | Name | Date |
|---|---|---|
| 1,717,039 | Karmazin | June 11, 1929 |
| 1,793,029 | Teetor | Feb. 17, 1931 |
| 2,300,435 | Ricciardi | Nov. 3, 1942 |
| 2,347,780 | Hermanns | May 2, 1944 |
| 2,367,672 | DiCosmo et al. | Jan. 23, 1945 |
| 2,388,871 | Scarff | Nov. 13, 1945 |
| 2,415,552 | Broecker | Feb. 11, 1947 |